United States Patent [19]

Rousseau

[11] Patent Number: 5,069,165
[45] Date of Patent: Dec. 3, 1991

[54] LIVESTOCK FEEDER SYSTEM

[76] Inventor: Victor Rousseau, 700, Route 259, Sainte-Monique, Quebec, Canada J0G 1N0

[21] Appl. No.: 596,505

[22] Filed: Oct. 12, 1990

[51] Int. Cl.$^5$ .............................................. A01K 5/02
[52] U.S. Cl. ................................ 119/57.6; 119/51.02; 119/56.1
[58] Field of Search ...................... 119/57.5, 57.6, 57.4, 119/57.1, 56.1, 56.2, 57, 51.13, 51.02, 57.92

[56] References Cited

U.S. PATENT DOCUMENTS

| | | | |
|---|---|---|---|
| 3,587,529 | 6/1971 | Wienert | 119/57.6 |
| 3,738,532 | 6/1973 | Fimbault | 119/57.6 |
| 4,223,638 | 9/1980 | Sappington et al. | 119/57.6 |
| 4,672,917 | 6/1987 | Fox | 119/57.1 |
| 4,712,511 | 12/1987 | Zamzow et al. | 119/51.02 |
| 4,981,107 | 1/1991 | Beaudoin et al. | 119/57.6 |

FOREIGN PATENT DOCUMENTS

| | | | |
|---|---|---|---|
| 2639423 | 3/1977 | Fed. Rep. of Germany | 119/57.6 |
| 3033485 | 4/1982 | Fed. Rep. of Germany | 119/57.6 |
| 3328504 | 2/1985 | Fed. Rep. of Germany | 119/57 |
| 2495892 | 6/1982 | France | 119/57.6 |
| 2510868 | 2/1983 | France | 119/56.1 |
| 1382456 | 3/1988 | U.S.S.R. | 119/57.6 |

Primary Examiner—Robert P. Swiatek
Assistant Examiner—Todd E. Manahan
Attorney, Agent, or Firm—Pierre Lespérance

[57] ABSTRACT

This system for feeding livestock is conceived to automatically identify the positions of the animals or of their stalls, and to automatically produce and dispense rations containing individualized feed mixtures programmable in relation with each particular animal and to readily adjust the rations according to the requirements of each animal. This livestock feeder system comprises an overhead guide track, a feed container suspended by a weighing scale from the guide track and divided into a plurality of compartments for different ingestible substances, conveyor screws to dispense and mix the substances and to produce and discharge the mixture, a programmable control unit to preset the different individualized rations, animal or stall position identifiers, and electric sensors to detect the positions and discharge the right ration at the right position for any particular animal.

14 Claims, 9 Drawing Sheets

LIVESTOCK FEEDER SYSTEM

FIELD OF THE INVENTION

This invention relates to a system for automated feeding of livestock at different positions, for instance when the animals are in stalls in a barn, and such as to feed rations of ingestible substances in individualized mixtures to each animal.

BACKGROUND OF THE INVENTION

The feeding of animals in particular in barns is very time-consuming, particularly if rations are manually determined for each animal or for groups of animals. This situation has been progressively worsening since the livestock farms are progressively increasing in size, at least herdwise, and the manpower is getting more expensive.

It must also be considered that nowadays the proper care of livestock and the requirements of efficient production and competition call for individualized rations of feed for each animal. This applies for milk cows, breeding animals, and meat cattles.

SUMMARY OF THE INVENTION

It is a general object of the present invention to provide a livestock feeder system that allows to produce automated feeding of livestock at different positions, such as in different stalls of a barn.

It is another general object of the present invention to provide a livestock feeder system that allows to automatically feed different rations of individualized feed mixtures to different animals or groups of animals.

It is another object of the present invention to provide a livestock feeder system that is programmable to stop at predetermined positions along a guidetrack and to produce and dispense individualized feed mixtures in relation with electronically identified animals or their positions along the guide track.

It is a further object of the present invention to provide a livestock feeder system of the above-mentioned type, which is of automated and simple operation and pimple and inexpensive construction to be conveniently installed and used on a farm.

It is still another object of the present invention to provide a livestock feeder system which produces individualized and use of the feed while satisfying the particular and real need of each animal.

It is another object of the present invention to provide a livestock feeder system of the above type, which allows to readily modify the rations, either in quantity, mixture, or both, thus allowing to quickly adjust to the results obtained with each particular animal.

It is another object and advantage of the present invention to provide a livestock feeder system which distributes the minerals and other digestible substances together with the ensilage in an integrated mixture, thus substantially preventing the segregation of substances by the livestock.

BRIEF DESCRIPTION OF THE DRAWINGS

The above and other objects and advantages of the present invention will be better understood with reference to the following detailed description of a preferred embodiment thereof, which is illustrated by way of example, in the accompanying drawings, in which:

FIG. 17 is another perspective view of the feeder unit modified to include safety plates operating switches to automatically stop the unit if hit by an animal or the like;

DESCRIPTION OF THE ILLUSTRATED EMBODIMENT

The illustrated livestock feeder system comprises a mobile feeder unit 10 operatively suspended to an overhead guide track 11. The latter is of uniform tubular cross-section and is provided with upstanding lugs 12 spaced along its length. Supporting bars 13 are fixed to the ceiling and are connected to the lugs 12 to fixedly support the overhead guide track 11.

Figure 2:
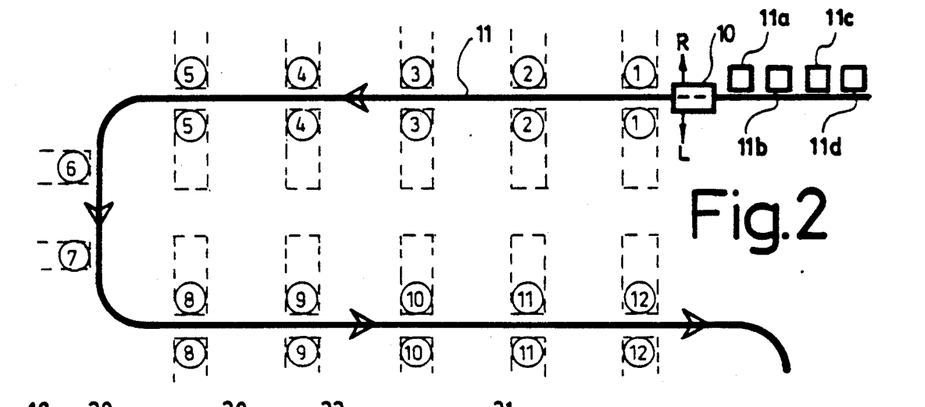
FIG. 2 is a diagram illustrating a plan view of stall positions and an associated system according to a possible barn layout.

As shown in FIG. 2, the guide track 11 extends centrally in the space separating the rows of stalls, shown in dash lines and numbered 1 to 12, and follows the particular layout of the stalls in the barn. The guide track 11 also extends along stations 11a to 11d for charging the batteries carried by unit 10 and for replenishing the compartments of the unit 10 with the various ingredients of the feed mixture to be delivered to the successive stalls. It is noted that stations 11a to 11d can be located anywhere along the rail and also the stations need not be close together.

The mobile feeder unit 10 forms a generally rectangular container 14 (FIG. 10) containing the ingestible substances to feed the livestock. The feed container forms a main compartment 15 and a secondary section 16 adjoining each other along a transverse line relative to the longitudinal direction of the container 14.

A pair of articulated suspension assemblies 17 rollably suspend the feed container 14 to the overhead guide track 11 (FIGS. 1, 3 to 5 and 16). The suspension assemblies 17 are attached to the feed container through the intermediary of a weighing mechanism at spaced-apart points longitudinally thereof. Each suspension assembly 17 includes a carriage rollably suspended to the guide track 11 and a swivel joint suspending the feed container weighing mechanism to the carriage. This carriage includes a U-shape bracket 18 forming a pair of outwardly bent upper portions 19. The latter allow to angularly install a set of four carriage wheels 20, such that the latter run on the tubular guide track 11 tangentially relative to its curved surface. Wheels 20 are fitted with bearings.

Figure 16:
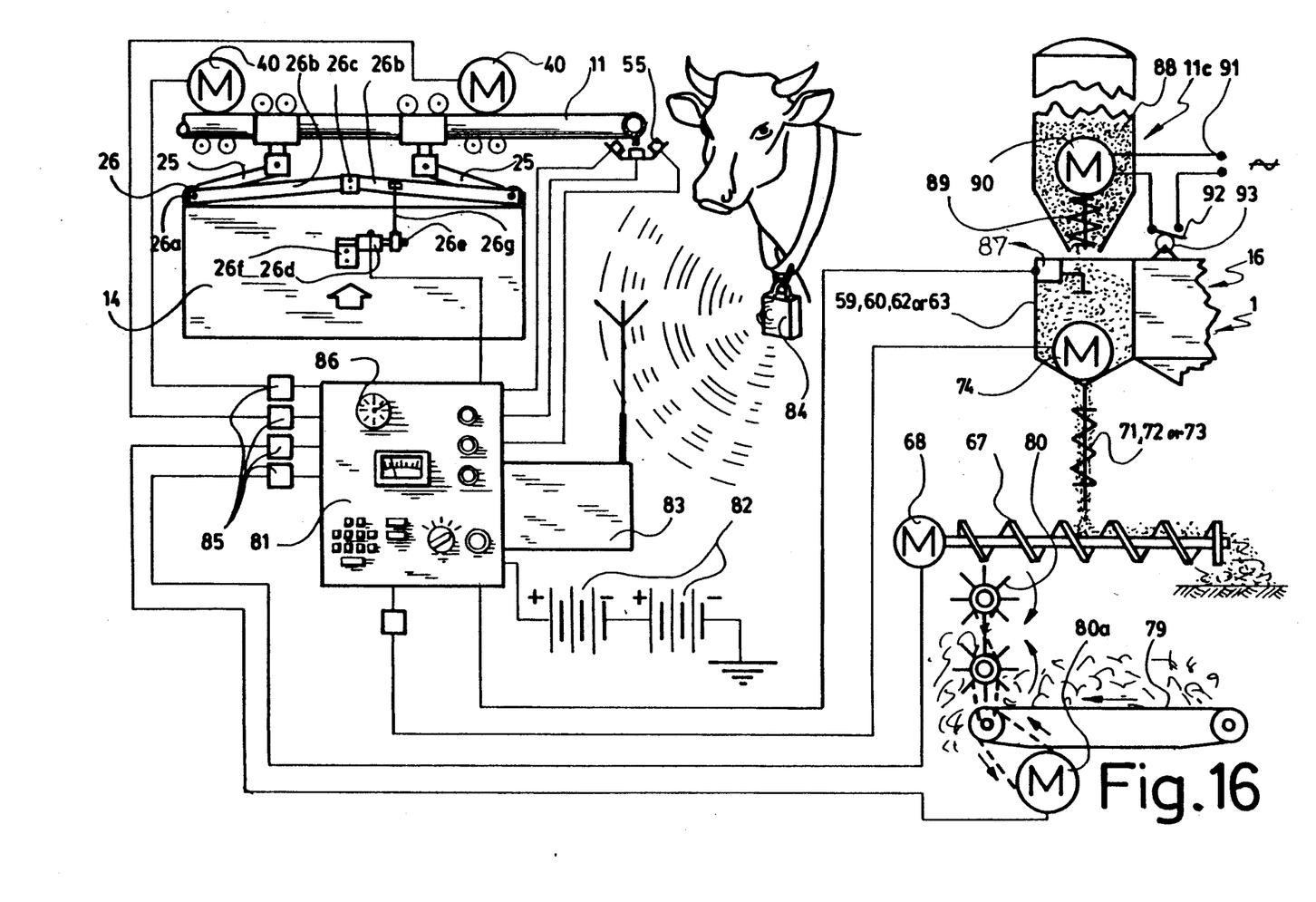
FIG. 16 is a schematic diagram showing the weighing system of the feed unit, how the unit can be positioned by a radio signal emitted by a particular cow and how the compartments of the feeder unit are to be replenished by ingredients.
Figure 17:
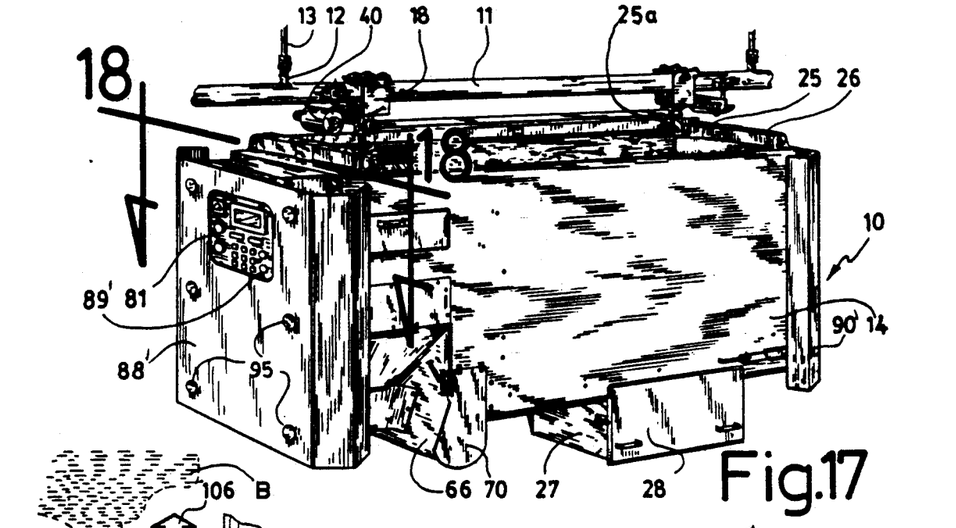
Figure 18:
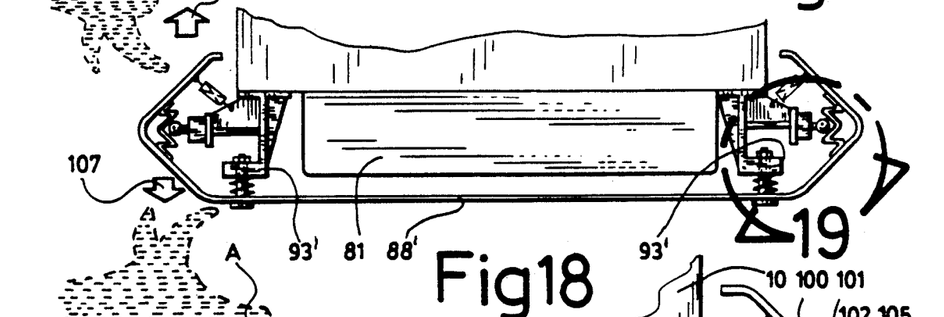
FIG. 18 is a partial top plan view, taken along line 18—18 of FIG. 17.

The mentioned swivel joint is formed by an upright bolt 21 swivelly suspending an inverted U-shape bracket 22 to the bracket 18 of the carriage. Preferably a thrust bearing is provided intermediate the bight of bracket 22 and the nut of bolt 21. Bracket 22 is pivoted by a bolt 22a to a block 24a. A pair of arms 23 are in turn pivotally suspended to the block 24a by articulation bolts 24 which are normal to bolt 22a to allow articulation about a transverse and a longitudinal axis relative to the feed container 14. The arms 23 are pivotally connected at 25a to the free end of a longitudinally-extending arm 25 rigidly projecting from a cross-beam 26 pivotally carried by pillow bearings 26a at the corresponding end of the feed container. The two arms 25 are oppositely directed (FIG. 16). Each cross beam 26 carries a bar 26b secured thereto. The two bars 26b are oppositely directed and are joined by a plate 26c screwed thereto and serving to adjust the mutual inclination of the two bars 26b. A strain gauge 26d is responsive to the angular movement of one bar 26b under the weight of container 14 and its content. The strain gauge is a sensor applied to a rod 26e to measure its flexion. Rod 26e is fixed at one end to a bracket 26f secured to container 14. The other end of rod 26e is attached to bar 26b through a length adjustable link 26g.

Figure 3:
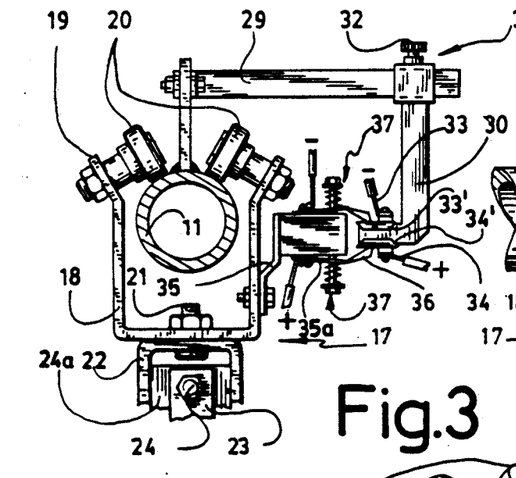
FIG. 3 is a detail view of a suspension assembly and associated electric connections, as seen along line 3—3 in FIG. 6.
Figure 4:
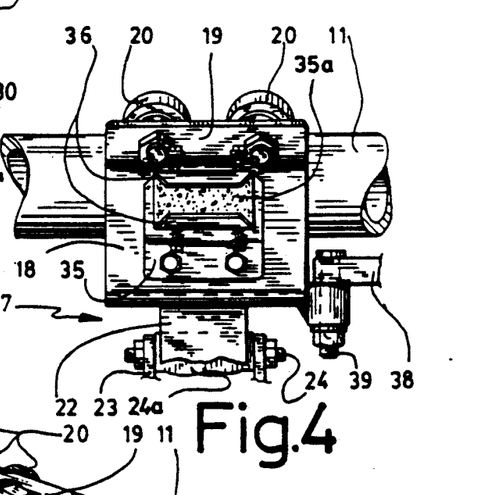
FIG. 4 is an elevation view as seen from the right in FIG. 3 and along line 4—4 in FIG. 6.

The mobile feeder unit 10 is provided with batteries 82 (FIG. 10), housed in an underlying box 27 and accessible through a removable door 28. The batteries are recharged when the mobile feeder unit stands at station 11a. At that station 11a, as best shown in FIGS. 3 and 4, an arm 29 laterally projects from the guide track and carries a downwardly-extending electrically insulating arm 30. The latter is laterally adjustable at 31 along the transverse arm 29 by means of a set srew 32. A pair of wires 33, 34 from an electric charger, not shown, are connected to a pair of terminals 33', 34' on the lower end of the arm 30. On one of the brackets 18, a plate 35 carries an insulator block 35a pivotally carrying a pair of electric calipers 36 positioned to make contact with the terminals 33', 34' respectively when the mobile feeder unit 10 reaches that position along the guide track. The calipers 36 are adjustably and resiliently retained by a pair of adjustment screws and springs at 37. A pair of electric wires connect the calipers 36 to the afore-mentioned batteries to recharge them.

Figure 6:
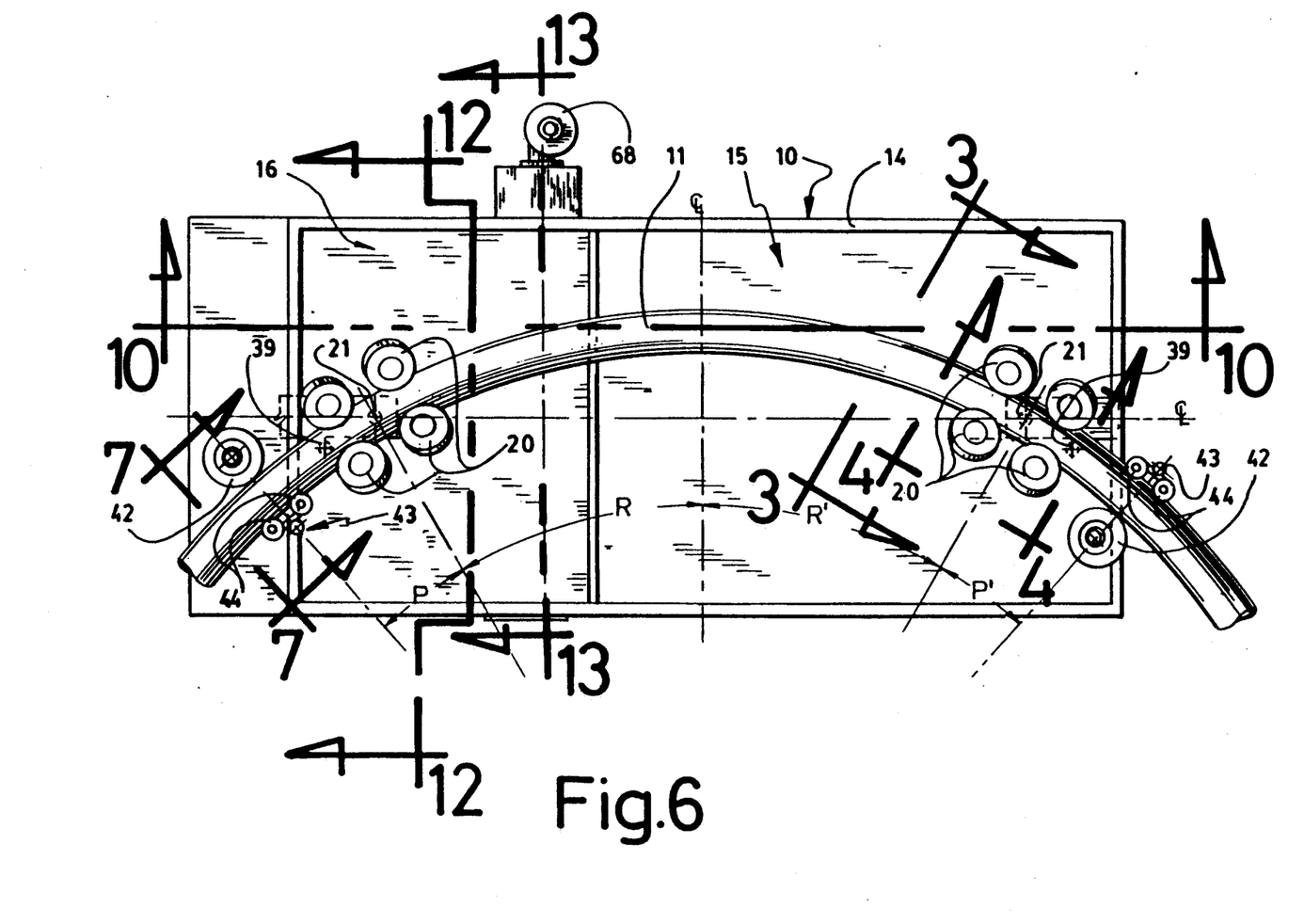
FIG. 6 is a top plan view of the mobile feeder unit and of a curved track section.

The drive system for the mobile feeder unit 10 includes a pair of drive units mounted on the articulated suspension assemblies 17, respectively. Each drive unit includes a base plate 38 pivotally secured by a bolt 39 to the corresponding bracket 18, as shown in more details in FIGS. 7, 8, and 8a. A motor 40 is fixed to the base plate 38 and is provided with a vertically-extending output shaft 41 carrying on its upper end a friction wheel 42 laterally engaging against one side of the overhead guide track 11. Motor 40 is preferably a hydraulic motor driven by a pump (not shown) but can be an electric motor with a speed reducer. The direction of rotation of motor 40 can be reversed. The wheel 42 of each drive unit thus provides traction for the mobile feeder unit through its frictional engagement with the guide track 11. A biasing system is mounted on each base plate 38 to hold the traction wheels 42 in frictional contact and is particularly important when the mobile feeder unit travels along a curved portion of the track, as shown in FIG. 6. Wheels 42 preferably have a polyurethane rim. Each biasing system includes an idler wheel unit, or carriage 43, provided with idler wheels 44 for rolling engagement with the opposite side of the guide track relative to the corresponding traction wheel 42. The idler wheel carriage 43 is mounted on a pivotally-connected column 45 fixed on a lever 46 that pivots about an axis 47 secured to the base plate 38. The lever 46 is formed with a projection 48. A handle 49 is pivoted by a bolt 5. to the base plate and a rod 51 extends through the outer end of the projection 48. A spring 51a is engaged around the rod 51 and abuts against the projection 48 to pivotally bias the lever 46 toward engagement of the idler wheel carriage 43 against the guide track. The rod 51 and the handle 49 are connected together to cooperatively form a toggle joint, as can be seen from FIGS. 8 and 8a. The displacement of the handle 49, as shown in FIG. 8a, produces pivotal disengagement of the idler wheel carriage from the track 11, as shown by the arrows, to enable manual moving of the mobile feeder unit along the track. It may be seen in FIG. 6 that the drive units and the biasing systems are arranged laterally opposite one to the other relative to the track. Thus, the traction wheel 42 at one end and the biasing carriage 43 at the other end of the mobile feeding unit 10 are on the same side of the track 11. This arrangement prevents handle 49 from interfering with adjacent carriage wheel 20 in a curved section of track 11.

The above described suspension assemblies and drive units enables the feeder to travel along a track 11 provided with turns of short radii of curvature. Also the traction is very good along the curved as well as the straight sections of the track 11.

Figure 5:
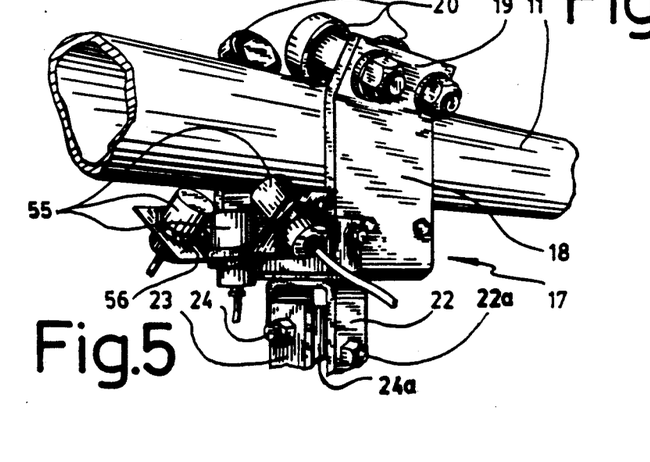
FIG. 5 is a perspective view of a carriage forming the upper part of the suspension assembly.
Figures 7, 9, 9A, 9B:
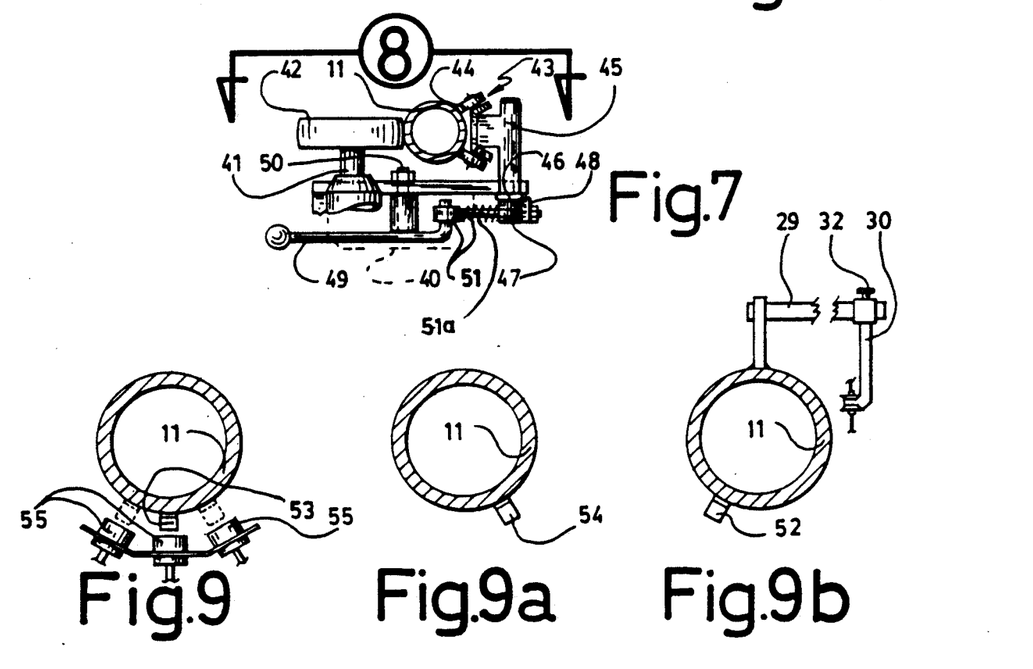
FIG. 7 is a cross-sectional view as seen along line 7—7 in FIG. 6.
FIG. 9 is a cross-section of the track with a central projection to identify stop positions of the mobile feeder unit along the overhead guide track.
FIGS. 9a and 9b are cross-sections of the track with lateral projections causing a reversal of direction of the feeder unit along the track.
Figure 8:
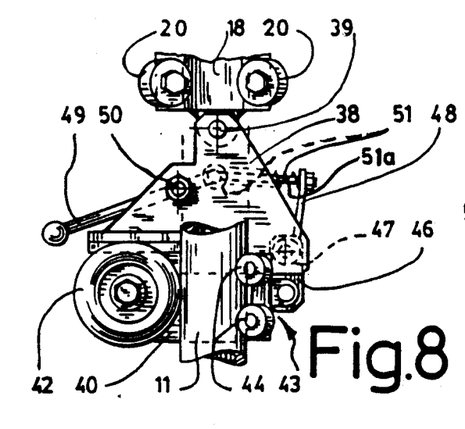
FIGS. 8 and 8a are top views as seen in the direction of the arrows 8 in FIG. 7 and shown in engaged and disengaged positions, respectively.
Figure 8A:
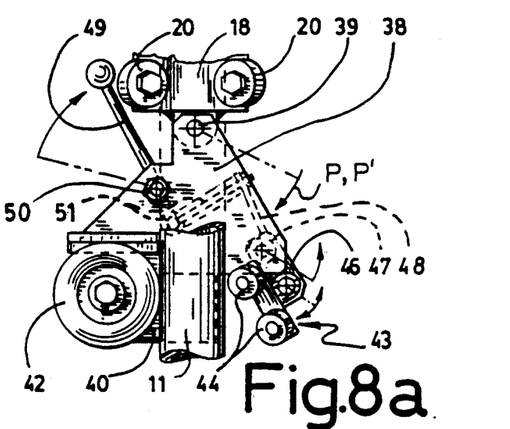

Metal projections 52, 53, and 54, as shown in FIGS. 9 to 9e, downwardly project form the tubular guide track 12 and are provided at predetermined spaced-apart positions along the track. A set of three electric sensors or proximity switches 55 are mounted on a base 56 adjustably attached to U-shape clamp 18, as best shown in FIG. 5. The electric sensors 55 are operatively connected to a programmable control mounted in unit 10 and which will be described later. Sensors 55, when coming in register with one or more of the metal projections 52,53, and 54, causes stoppage of the feeder unit 10 at the intended position along the track. It will be noted that with the arrangement of the three metal projections, seven possible combinations can be obtained, namely: a single central projection 53, a single lateral projection 54, a single lateral projection 52, the combination of projections 52, 53, the combination of projections 53, 54, the combination of projections 52, 54, and the combination of the three projections 52, 53, 54.

In the illustrated embodiment, a single central metal projection 53 is located at each station 11a to 11d and at each position of an animal along the track 11 (stations 11a to 11d and positions 1 to 12 (FIG. 2)); laterally inclined projections 52 and 54 (FIG. 9a and 9b) are located at any positions along the track 11 where reversal of the travelling direction of feeder unit 10 must take place.

Referring to FIGS. 9 to 9b, it will be seen that the projections 52,53, 54 are not welded but are simply provided with a layer of pressure adhesive to fix them at any selected position along the track 11. At least the lateral projections 52 and 54, can be made higher by making them of different superposed blocks adhered to each other so as to always be close to the sensors 55 in the areas of the turns of the track 11. It will be readily understood that, upon registration of the electric sensors 55 with the related metal projections 52, 53, and 54, a signal is transmitted to the programmable control unit to stop or to reverse the motors 40. At animal positions a ration of a feed mixture is discharged according to the particular animal or group of animals at that detected position along the guide track. Any particular station 11a to 11d or more and any particular animal or group of animals at any particular position may be preidentified identified according to the numerical order of the station inside or outside the barn, and of the animal stall in the barn. The animal position can also be identified by the identifying signal emitted by a radio emitter in the form of a badge or medal suspended from the animal neck.

Figures 10, 11:
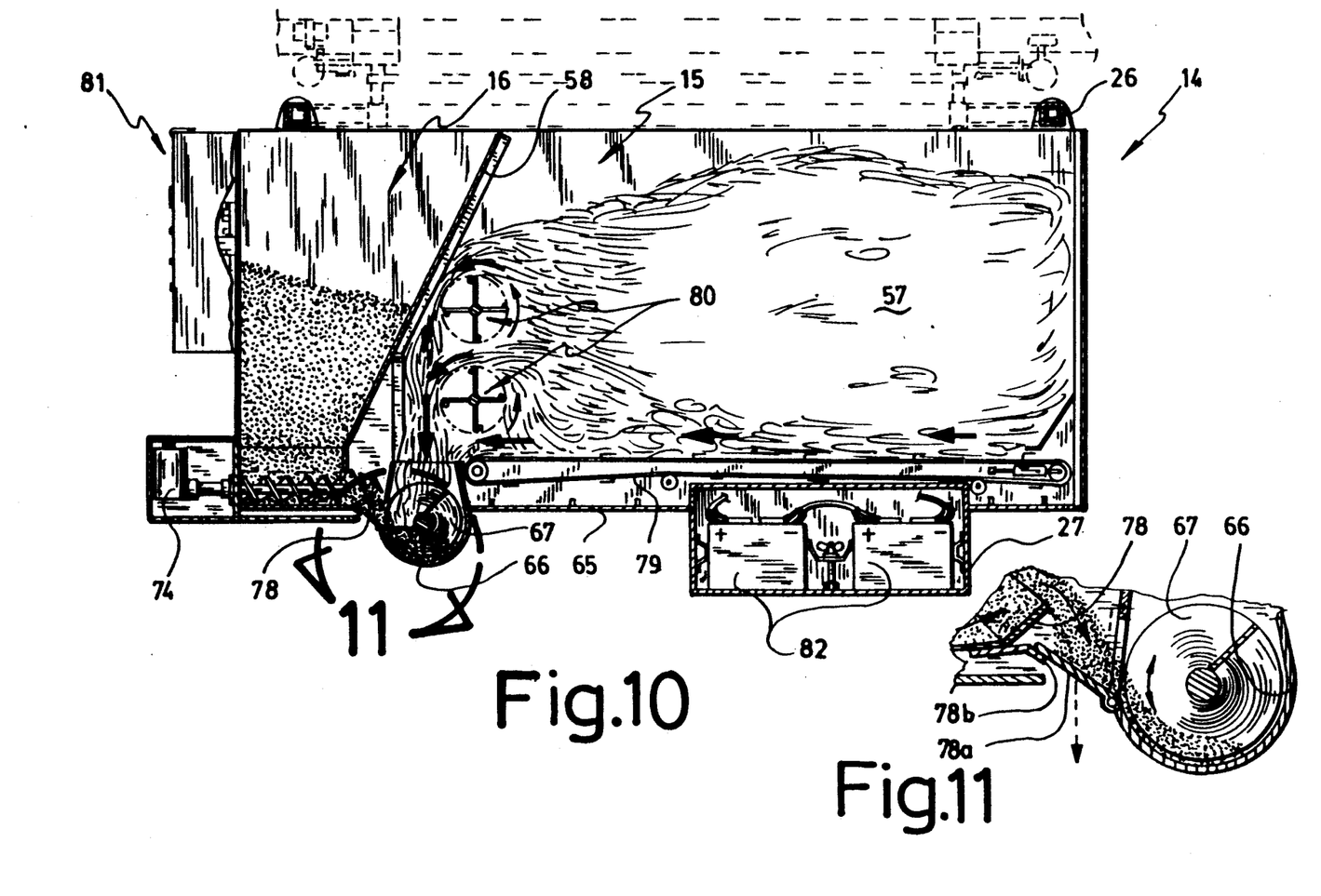
FIG. 10 is a longitudinal section of the mobile feeder unit as seen along line 10—10 in FIG. 6.
FIG. 11 is an enlarged view of the details encircled by the curved arrows 11 in FIG. 10.
Figures 13, 15:
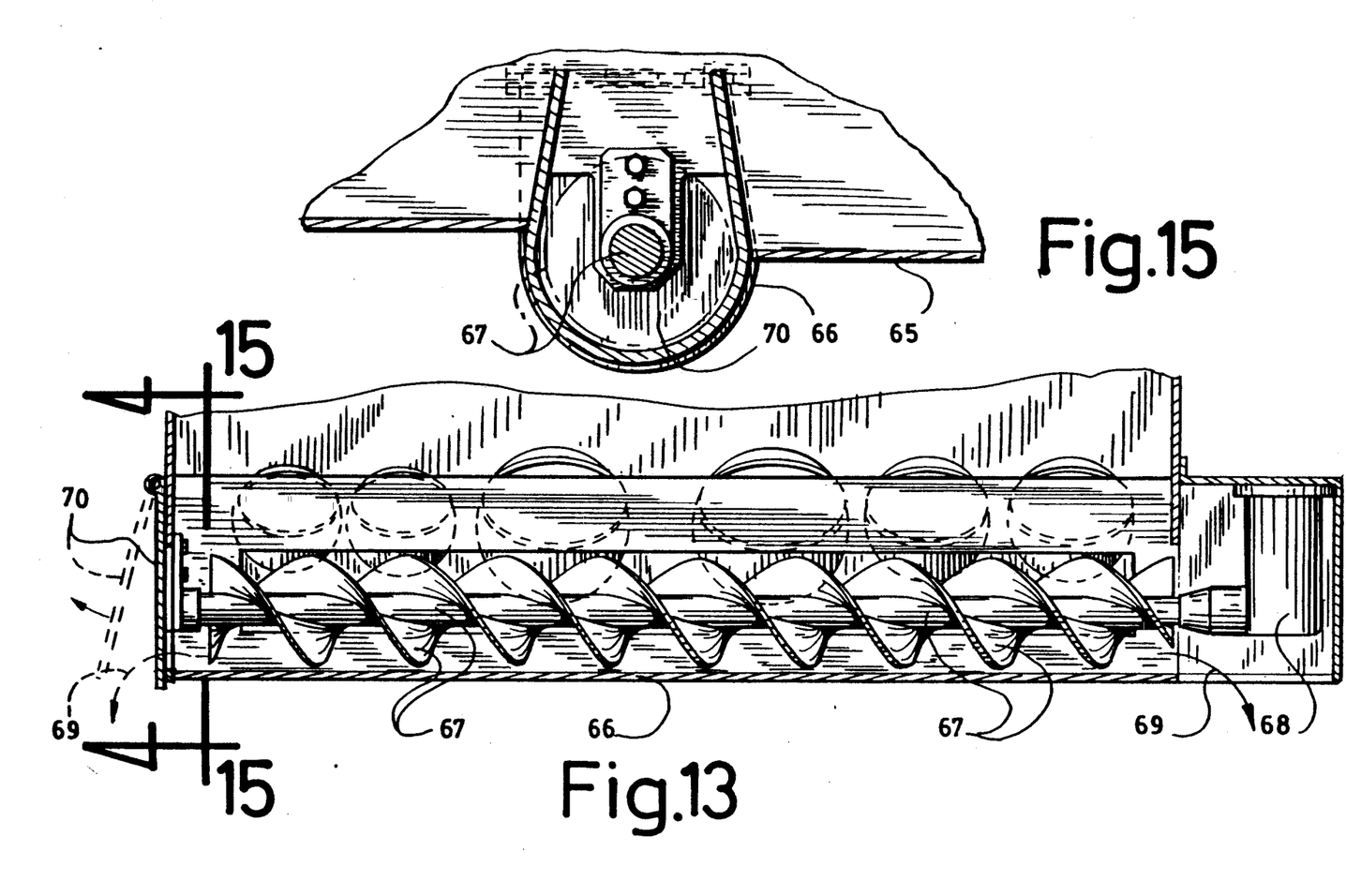
FIG. 15 is a cross-sectional view as seen along line 15—15 in FIG. 13.

Reference will now be made to FIGS. 10 and 15 inclusive to particularly describe the various compartments and mechanisms to operatively mix the various substances, and to dispense and discharge the substances as a mixture, such as to produce individualized mixtures and rations.

Figure 12:
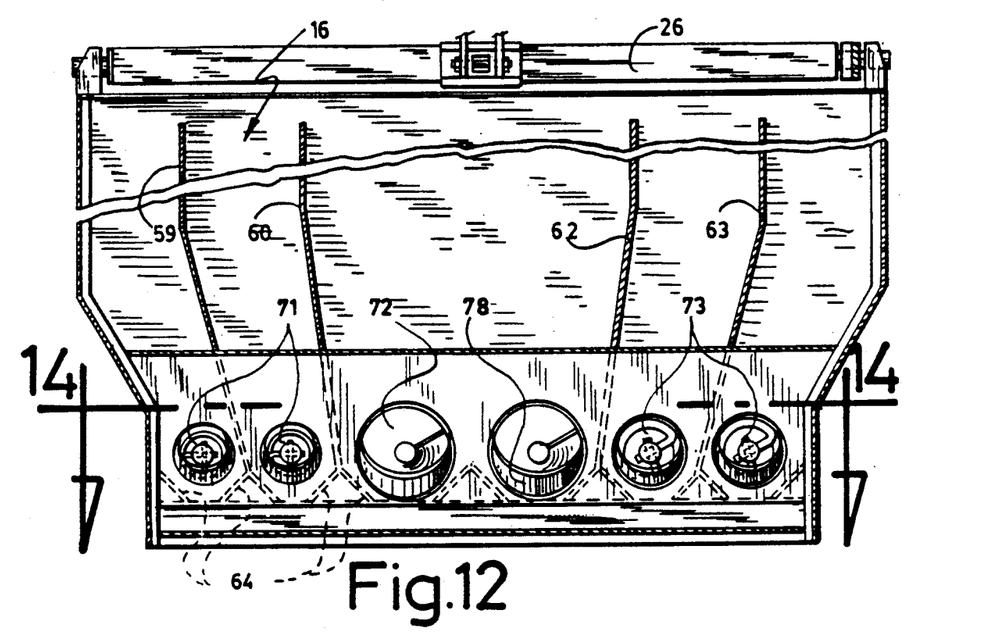
FIGS. 12 and 13 are transverse cross-section views through the mobile feeder unit as seen along lines 12—12 and 13—13, respectively, in FIG. 6.
Figure 14:
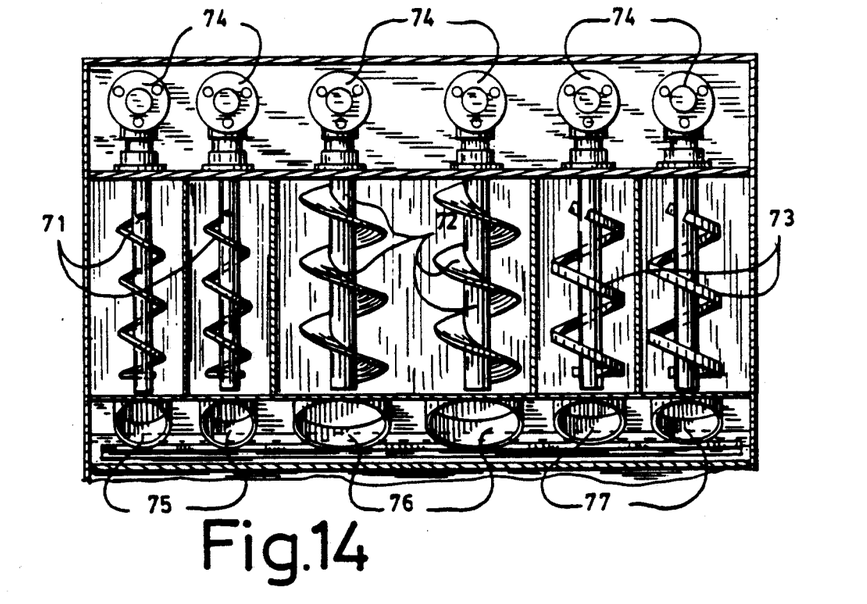
FIG. 14 is a cross-sectional view as seen along line 14—14 in FIG. 12.

The main compartment 15 is relatively large to contain a quantity of ensilage 57. A transverse panel 58 separates the ensilage from the other substances in the section 16. As best shown in FIGS. 12 and 14, the secondary compartment section 16 forms a set of five secondary compartments by means of dividing walls 59, 60, 62, and 63. Each secondary compartment has a lower portion that is substantially trough shaped by means of inclined walls 64 extending lengthwise thereof. The set of secondary compartments adjoin the main compartment along a transverse line defined by the transverse wall 58 and the secondary compartments are arranged side by side and longitudinally extend toward the transverse line and wall 58.

The bottom 65 of the feed container 14 is provided with a downwardly-projecting trough 66 longitudinally extending transversely of the feed container. A discharge conveyor screw 67 operatively extends in the trough 66 and is driven in either direction by an electric motor 68 (FIG. 13). At each end of the discharge screw 67, the feed container is provided with an outlet aperture for the discharge of the ration of digestible, either to the left or to the right, as shown by the arrows 69 in FIG. 13, depending on the direction of rotation of the discharge screw. On the opposite side relative to the motor 68, a pivotally-suspended and spring biased door 70 closes the corresponding discharge aperture when no discharge takes place.

Each secondary compartment in the section 16 is provided with one or two conveyor screws 71, 72, or 73 to dispense the substance of its compartment into the trough 66 of the mixture discharge screw 67. It must be noted that the dispensing screws 71, 72, 73 are of predetermined size and shape to define particular dispensing rates for a given speed of rotation. A similar motor 74 is connected to the outer end of each screw 71, 72, and 73 to rotate them at the same speed. The dispensing screws extend toward the transversely-extending mixture discharge screw 67 to dispense to it the desired substances in desired quantities as determined for any individualized ration and mixture. Each secondary compartment is provided with one or two tubular outlets 75, 76, or 77 of appropriate size and in alignment relative to the dispensing screws 71, 72, and 73, respectively. As best seen in FIGS. 10 and 11, each tubular outlet is formed with an upwardly-projecting lip portion, at 78, to better control the dripping of the granular substances into the transverse trough 66.

Referring to FIG. 12, each of the left-hand side compartments provided with the screws 71 is designed to contain and dispense one type of minerals, while the two right-handed compartments, each provided with the screws 73, are designed to contain and dispense soya and protein concentrates, respectively. The central compartment is designed to contain, for instance, corn in a much greater quantity than the other ingredients and, therefore, this central compartment is provided with two screws 72. If the ration calls for a low-corn ratio, only one screw 72 is operated. In this case, the two screws 72 are operated alternately at successive dispensing operations, in order to prevent jamming of the screw, corn usually being humid. If the corn ratio is high, then the two screws are operated. It will be noted that it is intended to start and terminate the dispensing of the various ingredients into the main mixture-dispensing screw 67 at approximately the same time.

Referring to FIG. 11, it will be seen that a gate 78A is pivotally mounted intermediate each lip portion 78 and the mixture-dispensing screw 67. This gate normally closes an opening 78B which bypasses the endless screw 67. Whenever it is desired to calibrate one or the other of the associated screws 71, 72, and 73 to ascertain whether the weight discharged by this screw during a certain amount of time, is exact, then the gate 78A is opened to uncover the opening 78B and the material, which is discharged through said opening, is collected during a measured time into a container, and the container is weighed. Normally, the gate 78A is in closed position, so that the material will be discharged directly into the trough containing the mixture-dispensing screw 67.

An endless chain conveyor 79 (FIG. 10) in the form of two spaced chains with transverse bars, runs lengthwise of the main compartment 15 and at its bottom to convey the ensilage toward the transverse discharge trough 66. A pair of transversely-extending rotary shredders 80 cut the ensilage before it falls on the mixture discharge screw where the other substances are mixed with it. Chain conveyer 79 and shredders 80 are driven by a common motor 80a (FIG. 16). The duration of rotation of each dispensing screw 71, 72, 73 and of the discharge screw 67 determines the quantities of each substance in the mixture and the quantity of the ration.

The scale determines the time during which mixture dispensing screw 67 will rotate.

Figure 1:
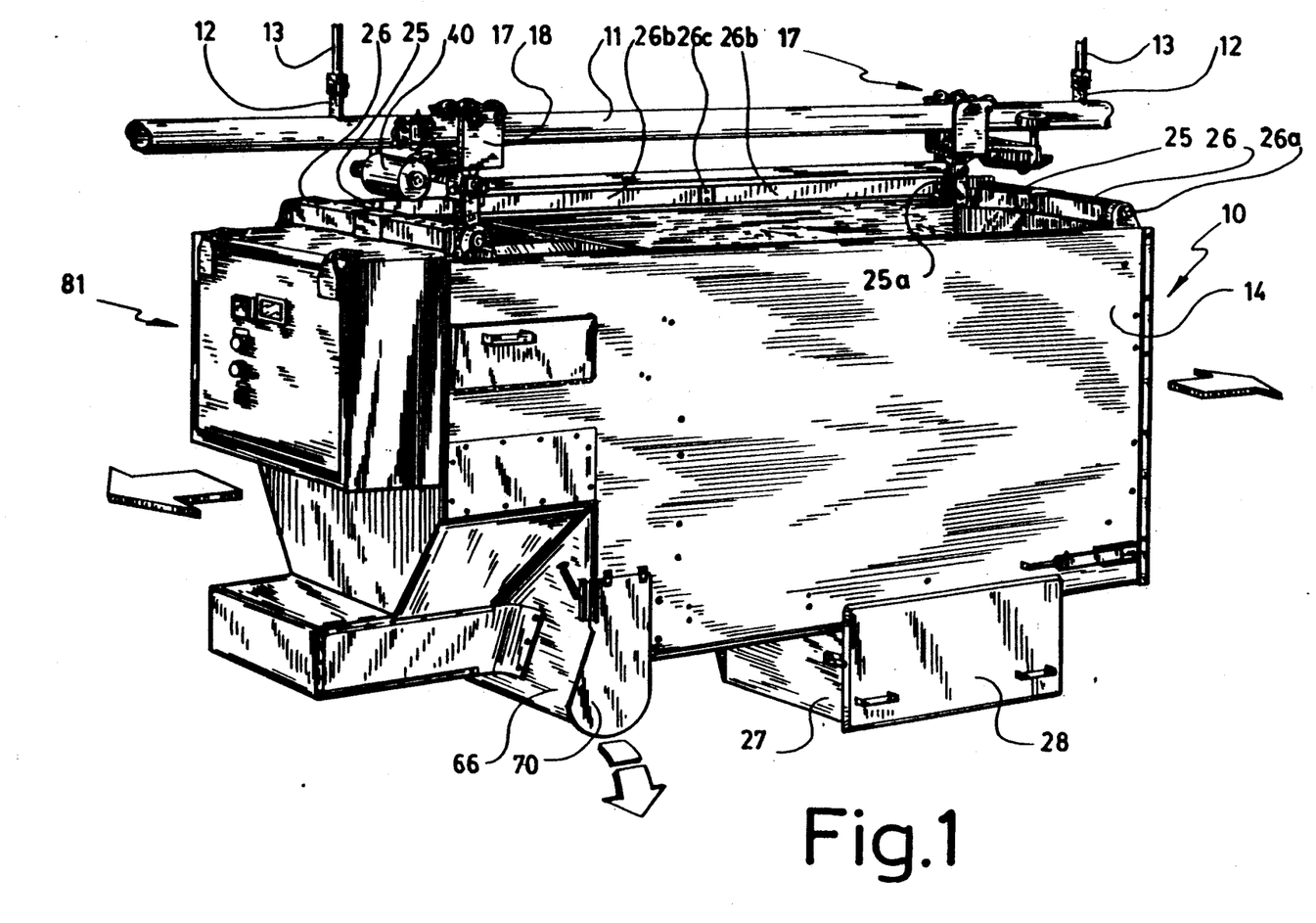
FIG. 1 is a perspective view of a section of an overhead guide track and a mobile feeder unit forming part of a livestock feeder system according to a preferred embodiment of the present invention.

A programmable control unit 81 is mounted on the feeder unit, as shown in FIG. 1, and also in FIG. 16. The control unit 81 is fed by batteries 82 mounted on the feeder unit (see FIG. 10). Control unit 81 has inputs from level sensing switches 87 referred to hereinafter, from the weighing scale strain gauge 26d, from the sensors 55, and from a radio receiver 83, including a decoder for decoding a coded signal emitted by a radio emitter 84 in the form of a badge carried by the animal to be fed. Control unit 81 has several outputs which control relays 85 for closing the circuits from batteries 82 to the traction motors 40; to the motors 74 for operating the conveyor screws 71, 72, and 73 of the feeder unit; to the motor 68 for operating the mixture-dispensing screw 67; and to the motor 80A for actuating the chain conveyor 79 and shredders 80 in the ensilage compartment. The motor 68 is also reversible and control unit 81 controls its reversal of rotation. Motors 68 and 80a are preferably hydraulic motors which can be operated at a higher speed during most of the time during mixture discharge and a lower speed in the final phase of mixture discharge so as to obtain a greater accuracy of the ration amount as determined by the weighing mechanism. Unit 81 includes a counter circuit, a timer circuit generally indicated at 86, and a computer or processor circuit which includes an erasable memory to store data concerning the individual rations of the animals as determined by their alimentation curves which is determined by the lactation curves in the case of cows. This data can be directly entered into unit 81 through push buttons, or the like, through an interface from a computer at a distant location. Thus, at each animal position, the ratio is distributed in accordance with the numerical order of the animal position or through its identifying badge 84. The motor 80A operating the ensilage conveyor 79 and shredders 80 is first started and the various motors 74 are started to operate the screws 71, 72 or 73 for a selected period of time, and the motor 80A is thereafter stopped. All during this time, the discharge screw 67 is operated. Thus, a very good mixture of the various ingredients is obtained just at the site of the animal to be fed. Moreover, the various proteins and mineral components must be necessarily be eaten by the animal, since they are all mixed with the ensilage, fodder and the like fibrous feed. No dust is produced in the barn, because the dry ingredients are directly mixed with the humid ensilage. The required amounts of the ingredients discharged by the screws 71, 72, 73 are measured by volume in accordance with the number of rotations of the screws. The required amount of ensilage is measured by the weight differential before and after discharge, as measured by the weighing mechanism.

Each compartment for storing the ingredients in the feeder unit 10 is provided with a maximum level indicating switch 87 used during replenishing of these compartments. This replenishing is carried out at the station 11B and following, as previously mentioned in connection with FIG. 2. At each of the stations, there is provided a silo, indicated at 88 in FIG. 16, the silo having a discharge screw 89 operated by an electric motor 90 fed with a current supply 91 when the switch 92 is closed. This switch closes when the feeder unit 10 is stopped by the sensors 55 at the required location with the compartment 59 to be filled opposite the silo 88. The switch 92 is closed, for instance by a roller 93 carried by the feeder unit 10. When the feeder unit compartment is sufficiently full, the level-indicating switch 87 is operated and causes control unit 81 to operate the motors 40 to displace the feeder 10 to the next station 11C etc. The filling operation is under the control of the timer circuit 86. If the level-detecting switch 87 does not function, or if the silo 88 is empty, after a predetermined delay, for instance fifteen minutes, the unit 81 will move the feeder unit 10 just sufficiently to open the switch 92 and a signal will be emitted to indicate that the silo 88 is empty, or that the switch 87 does not operate. The predetermined delay can vary from one silo 88 to another as programmed in the counter unit 81 in accordance with the positions of the successive silos along track 11. Between each animal feeding cycle, feeder unit 10 is at rest at the battery recharging station 11 during and after battery recharging. Unit 81 can be programmed to start operation of the feeder at any required time and for any number of feeding cycles per day, all automatically. Preferably, referring to FIG. 2, all the animals located on, say, the right-hand side of the track 11, are fed first, and the feeder unit on coming back to the replenishing station, will reverse the operation of the motor 68 and of the screw 67 to feed the animals on the opposite side of the track.

As an alternative, at any one position of the feeder unit, the control 81 can be programmed to feed an animal on one side and then the animal on the side of the track 11. Obviously, depending on the particular installation, the track can form a closed path or an open path. In the closed path configuration, the driving motors 40 need not be reversible.

The travelling feeder unit 10 is preferably provided with two collision sensor plates 88', 90', which, upon colliding with an obstacle, immediately causes stopping of the driving motors 40 and, consequently, of the unit 10 along the track 11 collision sensor plate 88' has a window 89' and is mounted at the end of a feeder unit provided with the control unit 81. Window 89' is in register with the operating knobs and the like of the control unit 81 to gain access thereto. The other collision sensor plate 90' is windowless and is mounted at the opposite end of the feeder unit. Each sensor plate 88', 90' is supported by bolts 91', having a stem of two different diameters defining a shoulder 92'. The reduced diameter stem portion extends through a hole made in a bracket 93' fixed to the casing of the feeder unit 10. A nut 97 is screwed on the bolt 91' at the back of bracket 93 to fix the bolt to the bracket. A compression coil spring 94 surrounds the bolt stem between the bracket 93' and the plate 88', the latter being pressed against the head 95 of the bolt. Plate 88' has transversely elongated bolt receiving openings. Spring 94 is maintained centered relative to bolt 91' by engaging a coaxial annular groove 96 at the front of bracket 93'. The two side edge portions of the plates 88' are inwardly bent to form V-shaped lateral extensions 99. Tension springs 100 are attached to the rear of bracket 93' and to the free inwardly-facing win 101 of the lateral extentions 99. A push button switch 102 is carried by the bracket 93' and its operating push button 103 engages the V 104 of a guide member 105 fixed to the inside of the lateral extension 99. Each side of each sensor plate 88' has circuit issuing from the control unit 81 and operating the relays 85 for the two driving motors 40. Switches 102 are normally closed and open upon displacement of their button 103 either laterally of the feeder unit 10, that is in a direction parallel to the sensor plate 88' or in a direction normal to sensor plate 88'.

Figure 19:
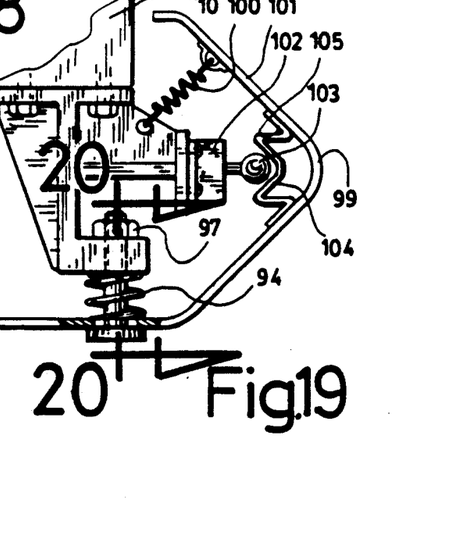
FIG. 19 is an enlarged view of the area encircled by double arrow 19 in FIG. 18.
Figure 20:
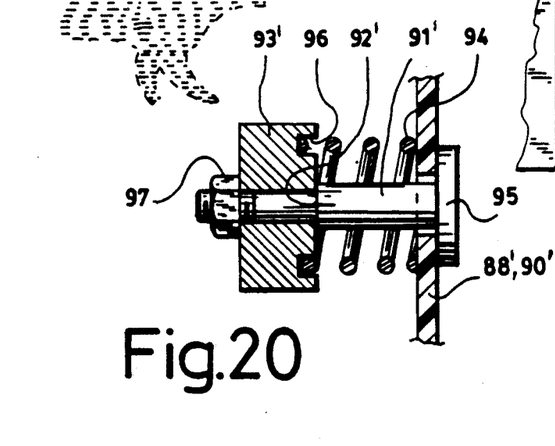
FIG. 20 is a section taken along line 20—20 in FIG. 19.

Therefore, if an animal A collides with the sensor plate, the latter will move towards the feeder unit (arrow 106) against the bias of the springs 94 and acting on the push button 103, which will stop the motors 40. The same will happen if animal B strikes the wing 101, to exert a force in the direction of arrow 107. A resultant force will cause transverse sliding of plate 88' relative to bolts 91' and the feeder unit will again be stopped. The same will happen if the apex of the V-shaped lateral extension 99 is hit and moves transversely Therefore, the collision sensor plates 88 prevent injury to animals or persons which might come in the path of the travelling feeder unit.

I claim:

1. A livestock feeder system comprising: an overhead guide track constructed and arranged to extend along a series of livestock positions and a feed container unit rollably suspended from the overhead guide track, said unit including a feed container, a drive system mounted on the feed container and constructed and arranged to operatively move the feed container over the overhead guide track, feed discharge means attached to the feed container, a powered-dispensing system connected to the feed container and constructed and arranged to outwardly dispense from the feed container feed received from the feed discharge means, and means to stop the drive system with the feed container unit in operative register with any of the livestock positions, wherein the drive system includes a pair of longitudinally-spaced carriages rollably suspended from the overhead guide track, a swivel joint swivelly suspending a corresponding end of the feed container to the corresponding carriage, each of said carriages including a body and wheels rotatably attached to the carriage body and rollably suspending the same from the overhead guide track and the drive system further including a pair of drive units operatively mounted on the carriage bodies, respectively, and each drive unit having a traction wheel frictionally engaging the overhead guide track and operatively producing tractional action thereon, each of the drive units including a base pivotally attached to a corresponding carriage body for free lateral swivelling displacement relative thereto, a motor secured to the corresponding base and drivingly connected to the corresponding traction wheel and biasing means operatively biasing the corresponding traction wheel into lateral engagement with the overhead guide track, said biasing means including an idler wheel unit having at least one idler wheel operatively engageable rollably against the opposite side of the overhead guide track relative to the corresponding traction wheel; and a spring operatively biasing the idler wheel unit towards engagement against the overhead guide track.

2. A livestock feeder system as defined in claim 1, wherein the biasing means further includes a release mechanism connected to the idler wheel unit and constructed and arranged to disengage the same from engagement with the overhead guide track.

3. A livestock feeder system as defined in claim 2, wherein the release mechanism includes an actuation lever and a bar operatively forming a toggle joint, connected to the idler wheel unit, and constructed and arranged to operatively pivot the latter toward and away relative to the lateral engagement thereof with the overhead guide track.

4. A livestock feeder system comprising: an overhead guide track constructed and arranged to extend along a series of livestock positions, a feed container rollably suspended from the overhead guide track, a plurality of compartments formed in the feed container, a single feed discharge attached to the feed container and operatively communicating with said compartments, a dispensing device operatively connected to each compartment and constructed and arranged to allow discharge of a selected quantity of an ingestible substance into the single feed discharge, an electric actuator connected to each dispensing device and selectively operating the same, and ration-setting means connected to the electric actuators and constructed and arranged to preset the relative operations of the actuators according to desired quantities of the substances to be discharged from the compartments, further including a pair of suspension assemblies engaging the overhead track, a weighing scale interconnecting said feed container and said suspension assemblies, said scale including means to produce an electric signal indicative of the weight of the feed container suspended therefrom, said signal fed to said ration-setting means and causing the same to stop operation of said single-feed discharge after a preset weight loss of said feed container.

5. A livestock feeder system as defined in claim 4, wherein the ration-setting means includes a programmable control unit connected to the actuators and starting said actuators simultaneously and selectively setting the length of operation of each actuator.

6. A livestock feeder system as defined in claim 5, wherein said dispensing devices include conveyor screws having different rates of discharge.

7. A livestock feeder system as defined in claim 4, wherein said compartments include a main compartment for containing fibrous feed, and a set of secondary compartments for containing different granular feeds and adjoining the main compartment along a transverse line relative to the direction of displacement, said single feed discharge being a conveyor screw which longitudinally extends along said transverse line substantially underlying said compartments the dispensing device of said main compartment including shredders and an endless conveyor mounted within and along the bottom of said main compartment, respectively, the dispensing device of said secondary compartment including secondary conveyor screws operatively discharging endwise into the main conveyor screw.

8. A livestock feeder system comprising an overhead guide track constructed and arranged to extend along a series of livestock positions and a feed container unit rollably suspended from the overhead guide track, said unit including a feed container, a drive system mounted on the feed container and constructed and arranged to operatively move the feed container over the overhead guide track, feed-discharge means attached to the feed container, a powered-dispensing system connected to the feed container and constructed and arranged to outwardly dispense from the feed container feed received from the feed-discharge means and means to stop the drive system with the feed container unit in operative registry with any of the livestock positions, the drive system including a pair of longitudinally-spaced carriages rollably suspended from the overhead guide track, a swivel joint swivelly suspending a corresponding end of the feed container to the corresponding carriage, each of said carriages including a body and wheels rotatably attached to the carriage body and rollably suspending the same from the overhead guide track; and the drive system further including a pair of drive units operatively mounted on the carriage bodies, respectively, and each drive unit having a traction wheel frictionally engaging the overhead guide track and operatively producing tractional action thereon, and further including collision-sensing means including plates movably carried by said feeder unit at both ends thereof, biasing means biasing each plate to a rest-position relative to the feeder unit, and switching means sensing the instantaneous position of said plates relative to the feeder unit and disabling operation of said drive units when either one of said plates is out of its rest-position.

9. A livestock feeder system comprising an overhead track adapted to extend along a plurality of animal positions, a pair of suspension assemblies including a drive system mounted on said track, a feeder unit, a weighing scale suspending said feeder unit from said suspension assemblies, said feeder unit movable by said drive system along said track and stopping at said animal positions, said feeder unit including an elongated container composed of a main compartment and of several secondary compartments, said elongated container suspended from said scale longitudinally of said track, a discharge trough disposed transversely of said container and opening at both sides of the latter, a main discharge conveyor screw in said trough, a reversible actuator for said screw, an endless conveyor means in the bottom of said main compartment to fill said trough with a fibrous feed, secondary discharge conveyor screws located in said secondary compartments and disposed normal to said transverse trough and discharging different granular ingredients from said respective secondary compartments into said transverse trough, and a programmable control unit carried by said feeder unit and controlling the number of turns of each secondary conveyor screw and the operating time of said endless conveyor means and of said main discharge conveyor screw responsive to the weight loss indicated by said scale, said control unit causing starting of the operation of said secondary discharge conveyor screws and then their stopping after and before the start and cessation respectively of operation of said endless conveyor means and main discharge conveyor screw, so as to produce in said trough a substantially uniform mixture of said fibrous feed and of all the granular ingredients before they are discharged at the animal position.

10. A livestock feeder unit comprising a feeder container, a mobile support for said container carrying said container along a series of livestock positions, a weighing scale interconnecting said feeder container and said support for weighing said container and its contents, said container composed of a main compartment for containing fibrous feed and of several secondary compartments disposed side by side and for containing different granula feeds, a discharge trough with which the bottom portions of all compartments communicate, a main discharge power-operated conveyor screw in said trough, secondary power-operated conveyor screws located in the bottom portions of said secondary compartments and disposed normal to said trough and to said main discharge conveyor screw for discharging granular feeds from said respective secondary compartments in to said transverse trough, power-operated fibrous feed shredders in said main compartment and a power-operated endless conveyor in the bottom portion of said main compartment for discharging fibrous feed from said main compartment into said transverse trough, and a programmable control unit carried by said feeder unit and controlling the number of turns of each secondary conveyor screw and, responsive to an indication from said weighing scale, the operating time of said endless conveyor and of said main discharge conveyor screw, said control unit causing concurrent operations of said main and secondary conveyor screws and of said shredders and endless conveyor, so as to mix the granular feeds with the fibrous feed before discharge of the resulting mixture from the feeder unit.

11. A livestock feeder unit as defined in claim 10, wherein said control unit causes starting of the operation of said secondary conveyor screws and then their stopping after and before the start and cessation, respectively, of operation of said endless conveyor means and of said main discharge conveyor screw, so as to produce in said trough a substantially uniform mixture of all the fibrous and granular feeds before they are discharged at a livestock position.

12. A livestock feeder unit as defined in claim 10, wherein said secondary conveyor screws have different rates of discharge for the same rotational speed.

13. A livestock feeder unit as claimed in claim 12, wherein the storing capacity of at least one of said secondary compartments is larger than the storing capacity of the remaining secondary compartments, and the bottom portion of said one secondary compartment has at least two secondary conveyor screws disposed side by side.

14. A livestock feeder unit as defined in claim 10, wherein the bottom portion of each said secondary compartment has a discharge end in communication with said trough; and further including an upwardly-inclined lip portion in said discharge end.

* * * * *